US009955445B2

(12) United States Patent
Vrind et al.

(10) Patent No.: US 9,955,445 B2
(45) Date of Patent: Apr. 24, 2018

(54) SYSTEM AND METHOD FOR ENHANCING REPORTING INFORMATION FOR RADIO LINK FAILURE (RLF) IN LTE NETWORKS (71) Applicant: Samsung Electronics Co., Ltd., Gyeonggi-do (KR)

(72) Inventors: Tushar Vrind, Bangalore (IN); Balaji Srinivasan Thiruvenkatachari, Bangalore (IN); Shrinath Ramamoorthy Madhurantakam, Bangalore (IN)

(73) Assignee: Samsung Electronics Co., Ltd (KR)

( * ) Notice: Subject to any disclaimer, the term of this patent is extended or adjusted under 35 U.S.C. 154(b) by 106 days.

(21) Appl. No.: 14/667,044

(22) Filed: Mar. 24, 2015

(65) Prior Publication Data
US 2015/0282107 A1 Oct. 1, 2015

Related U.S. Application Data (60) Provisional application No. 61/973,607, filed on Apr. 1, 2014.

(30) Foreign Application Priority Data

Feb. 11, 2015 (KR) ........................ 10-2015-0021092

(51) Int. Cl.
H04W 4/00 (2009.01)
H04W 56/00 (2009.01)
H04W 76/02 (2009.01)
H04W 24/02 (2009.01)

(52) U.S. Cl.
CPC ......... *H04W 56/003* (2013.01); *H04W 76/02* (2013.01); *H04W 24/02* (2013.01)

(58) Field of Classification Search
CPC combination set(s) only.
See application file for complete search history.

(56) References Cited

U.S. PATENT DOCUMENTS

| 8,571,542 | B2 | 10/2013 | Wu | |
|---|---|---|---|---|
| 8,577,360 | B2 | 11/2013 | Olsson | |
| 8,711,709 | B2* | 4/2014 | Marinier | H04W 72/02 370/242 |
| 8,958,755 | B2* | 2/2015 | Jung | H04W 24/08 455/423 |
| 2012/0083263 | A1 | 4/2012 | Kim et al. | |
| 2012/0281548 | A1* | 11/2012 | Lin | H04W 36/30 370/242 |

(Continued)

OTHER PUBLICATIONS

3GPP TSG-RAN WG1 Meeting #69bis, 4C-HSDPA Radio Link Failure Enhancement, 3 pages, Apr. 2010.*

(Continued)

*Primary Examiner* — Frank Duong
(74) *Attorney, Agent, or Firm* — The Farrell Law Firm, P.C.

(57) ABSTRACT

A method of and User Equipment (UE) for enhancing reporting information for a Radio Link Failure (RLF) in a Long Term Evolution (LTE) network. The method includes receiving, by a User Equipment (UE), RLF threshold information transmitted from the LTE network, logging, by the UE, the RLF threshold information, and indicating, by the UE, a recovery from a near RLF condition.

13 Claims, 4 Drawing Sheets

(56) References Cited

U.S. PATENT DOCUMENTS

2013/0272139 A1* 10/2013 Guo ..................... H04W 24/08
370/242
2014/0128057 A1* 5/2014 Siomina ............... H04J 3/0685
455/423
2016/0234739 A1* 8/2016 Puddle ............. H04W 36/0055

OTHER PUBLICATIONS

ETSI, LTE; Evolved Universal Terrestrial Radio Access (E-UTRS); Radio Resource Control (RRC); Protocol Specification (3GPP TS 36.331 version 9.12.0 Release 9) ETSI TS 136 331 V9.12.0 (Nov. 2012).

* cited by examiner

SYSTEM AND METHOD FOR ENHANCING REPORTING INFORMATION FOR RADIO LINK FAILURE (RLF) IN LTE NETWORKS

PRIORITY

This application claims priority under 35 U.S.C. § 119 to a U.S. Provisional Application filed on Apr. 1, 2014 in the U.S. Patent and Trademark Office and assigned Ser. No. 61/973,607, and Korean Patent Application filed on Feb. 11, 2015 in the Korean Intellectual Property Office and assigned serial No. 10-2015-0021092, the entire contents of which are incorporated herein by reference.

BACKGROUND

1. Field of the Disclosure

The present disclosure relates generally to a wireless communication system, and more particularly, to a system and method for logging and reporting information for an averted Radio Link Failure (RLF) in the Minimization of Drive Test (MDT) framework for a $3^{RD}$ Generation Partnership Project (3GPP) Long Term Evolution (LTE) scheme.

2. Description of the Related Art

Wireless communication systems are widely deployed to provide various types of communication content such as voice and data. Typical wireless communication systems may be multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and the like. Additionally, the systems can conform to specifications such as $3^{RD}$ Generation Partnership Project (3GPP), 3GGP 2 (3GPP2), High Speed Packet Access (HSPA), High Speed Downlink Packet Access (HSDPA), High Speed Uplink Packet Access (HSUPA), 3GPP Long-Term Evolution (LTE), LTE Advanced (LTE-A), etc.

A 3GPP Long Term Evolution (LTE) User Equipment (UE) while in Radio Resource Control (RCC) connected mode can face a Radio Link Failure (RLF), and can declare an RLF on detection of at least one of physical layer problems, random access problem indication from a Medium Access Control (MAC) layer, and an indication from a Radio Link Control RLC that a maximum number of retransmissions has been reached. From a network optimization perspective, whenever the RLF is declared, the UE is expected to record a snapshot of the serving cell measurements along with the measurements of a neighboring cell that is available, so that whenever the UE subsequently reenters a connected mode with the serving cell or any of the neighboring cells, the UE can inform the network regarding the availability of measurements when the RLF was encountered. This process can help in network optimization.

3GPP Minimization of Drive Test (MDT) Work Item has devised a standard procedure of UE storing these measurement information on occurrence of an RLF and reporting the information back to the network the next time that the UE attempts an RRC Connection Re-Establishment procedure or an RRC Connection Establishment procedure. Such RLF information is helpful for a network as it equips operators with real time information from fields from various UEs and assists them to perform improved network planning.

Figure 1:
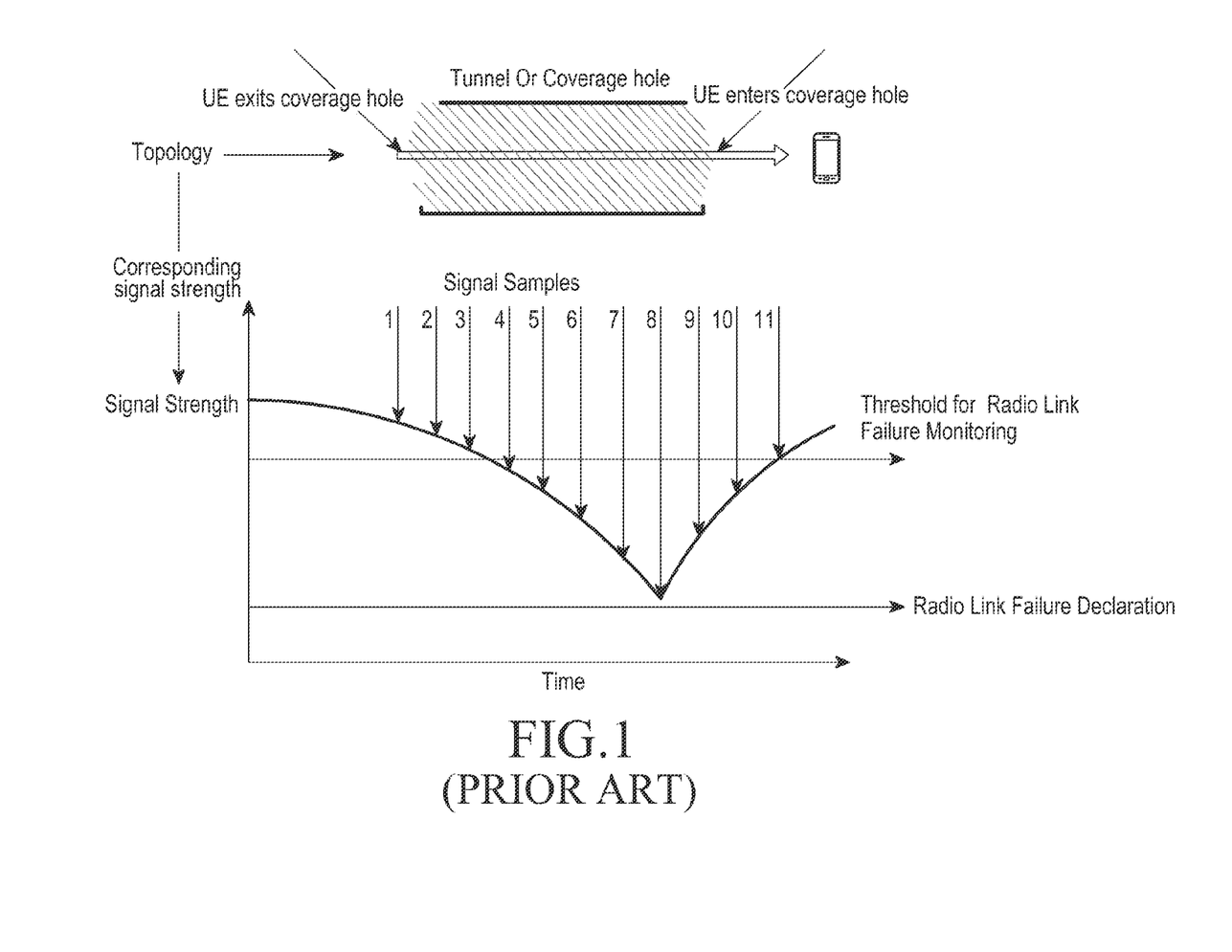
FIG. 1 is a timing diagram of a User Equipment (UE) facing an RLF over a period of time while entering and leaving a coverage hole according to a use case illustration.

FIG. 1 illustrates a timing graph of a UE facing an RLF over a period of time according to a use case. The timing graph is obtained based on signal samples received by the UE at different instances of time while moving through a coverage hole or tunnel. The signal samples indicate the strength of the signal received by the UE from the network at different time periods. The UE has a particular threshold signal strength set for initiating monitoring of an RLF. If the signal strength of the signal sample received by the UE goes below the threshold, the UE identifies that the UE initiates monitoring an RLF situation. In a similar manner, the UE sets a certain signal strength upon reaching a certain signal strength measurement and the UE declares that an RLF has occurred.

According to FIG. 1, the UE moves through a tunnel or coverage hole. While entering the tunnel, the signal strength of the signal sample is noted. As the UE moves through the tunnel, it can be observed that the signal strength of the signal samples decreases as the UE moves towards the center of the tunnel. At a certain point in the tunnel, the signal strength goes below the threshold and the UE initiates monitoring of the signal samples for an RLF situation. The UE records measurements of the signal strengths of the samples at pre-determined time intervals. At a certain time period the UE observes a measurement that shows that the UE is about to face an RLF but recovers. It is referred to as a "near radio link failure" situation. The UE may temporarily experience loss of synchronization but recovers in time before reaching a condition to declare an RLF is met. As the UE has recovered before the RLF occurred, the UE does not record the measurements of the service cell and its neighboring cells.

In an initial deployment scenario, the UE initiates the RLF monitoring procedure, but before it faces an RLF, the UE might recover. But per the procedure, the UE will not record measurements and report them. It should be noted that a UE in a slow moving vehicle may encounter an RLF. Hence even information related to a near RLF situation is helpful to the network.

In LTE specifications R12/R13 it is expected that there will be a dense deployment of small cells and it will alter the UE geometry due to the heterogeneous network deployment in the field. Thus, information regarding weak network coverage areas may be required by operators for optimizing configuration parameters for an improved end user experience.

Thus, there is a need for a procedure to capture near RLF information when UEs face temporary synchronization failures and recover before declaring an RLF.

SUMMARY

The present disclosure has been made to address the above-mentioned problems and disadvantages, and to provide at least the advantages described below. Accordingly, an aspect of the present disclosure provides a system and method for logging and reporting information for a near/averted Radio Link Failure (RLF) in the Minimization of Drive Test (MDT) framework for 3GPP LTE.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS OF THE PRESENT DISCLOSURE

The present disclosure provides a system and method for logging and reporting information for a near/averted RLF in the MDT framework for 3GPP LTE. In the following detailed description of the embodiments of the present disclosure, reference is made to the accompanying drawings that form a part hereof, and in which are shown by way of illustration embodiments of the present disclosure in which the present disclosure may be practiced. The embodiments of the present disclosure are described in sufficient detail to enable those skilled in the art to practice the present disclosure, and it is to be understood that other embodiments may be utilized and that changes may be made without departing from the scope and spirit of the present disclosure. The following detailed description is, therefore, not to be taken in a limiting sense, and the scope of the present disclosure is defined only by the appended claims and their equivalents. Although specific features of the present disclosure are shown in some drawings and not in others, this is done for convenience only, as each feature may be combined with any or all of the other features in accordance with the present disclosure.

The specification may refer to "an," "one" or "some" embodiment(s) of the present disclosure in several locations. This does not necessarily imply that each such reference is to the same embodiment(s), or that the feature only applies to a single embodiment. Single features of different embodiments of the present disclosure may also be combined to provide other embodiments.

As used herein, the singular forms "a," "an" and "the" are intended to include the plural forms as well, unless expressly stated otherwise. It will be further understood that the terms "includes," "comprises," "including" and/or "comprising" when used in this specification specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The various embodiments herein disclose methods for enhancing reporting information for an RLF in an LTE network. The present method discloses various embodiments of the present disclosure to identify near RLF situations, logging required information during the situation, and reporting the RLF situation according to the RLF information obtained from logging.

According to the present disclosure, a UE receives RLF thresholds (e.g. timers and/or constants) from a network on which it is located. According to an embodiment of the present disclosure, an RLF can be caused by problems in a physical layer of a network. In an embodiment of the present disclosure, an RLF can be caused by problems experienced during a random access procedure of a MAC layer. In another embodiment of the present disclosure, an RLF can be experienced due to a failure in a maximum number of retransmissions at Radio Link Control (RLC).

According to the present disclosure, a method comprises using triggers at which a UE logs information related to an RLF upon entering an RLF situation triggered by any one of the above mentioned situations or conditions. Based on the condition and the logged RLF information, upon recovery from the situation, a UE retains the stored data and indicate the presence of the same to the network so that network can retrieve the same.

Figure 2:
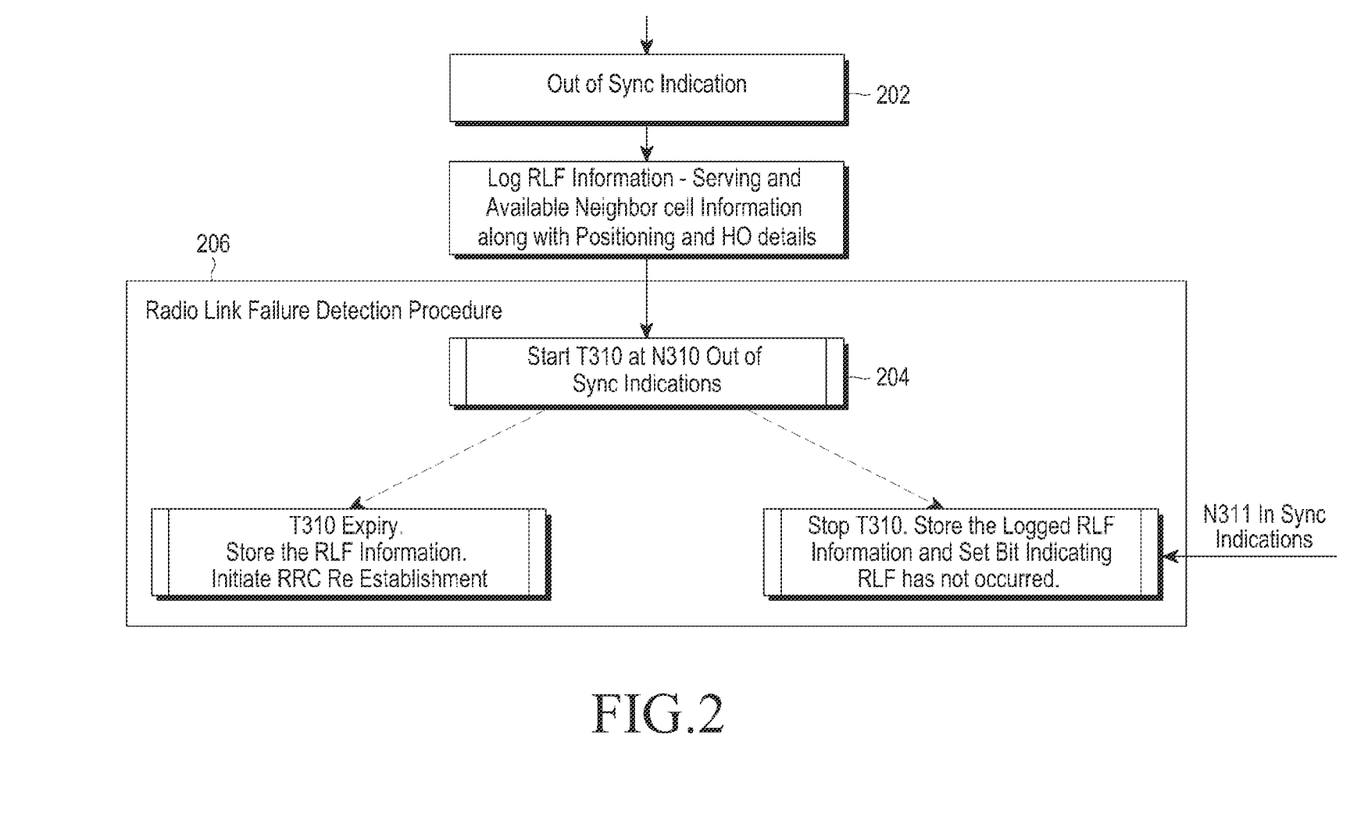
FIG. 2 is a flowchart illustrating a method for enhancing reporting information for an RLF at a physical layer in an LTE network according to an embodiment of the present disclosure.

FIG. 2 is a flowchart illustrating a method for enhancing reporting information for an RLF at a physical layer in an LTE network according to an embodiment of the present disclosure. According to an embodiment of the present disclosure, in step 202, a UE receives RLF threshold (e.g., timers and/or constants) information transmitted from a network. According to an embodiment of the present disclosure, the RLF information transmitted from the network can be, but is not limited to, link quality measurement of serving carriers, one or more secondary carriers along with link quality information for secondary carriers, wherein the link quality measurement indicates an "Out of Sync" indication, and the like.

Further, in step 204, the UE initiates logging of the RLF information along with a data report. The logging of RLF information is initiated upon each reception of the "Out of Sync" indication from the physical layer. According to the present disclosure, the logged information comprising a number of "Out of Sync" indications received from the physical layer along with a timer value of an elapsed timer along with near RLF stored measurements from the UE, which are stored in the UE for future reference.

According to an embodiment of the present disclosure, the information logged and stored in the UE can be of the type of a bit type representation flag in an RRC connection establishment message. In an embodiment of the present disclosure, the logged and stored information in the UE can be of the type of, but is not limited to, a decimal type representation, hexa-decimal type representation, and the like. According to an embodiment of the present disclosure, the RRC establishment message from the UE to the network is sent as an indication of not triggering the RRC reestablishment, but for notifying the availability of the near RLF information.

In step 206, the UE initiates an RLF recovery according to RLF information received, wherein the RLF recovery comprises triggering a timer on reception of the RLF information, storing the RLF information, and initiating an RRC connection re-establishment before the timer expires.

For example, if any physical layer problems are detected upon reception of N310 consecutive out of synchronization or "Out of Sync" indications from the physical layer, the RRC initiates a T310 timer. If the T310 timer expires, then the UE declares an RLF situation at the physical layer. The UE logs the information when the RLF situation is declared and stores the information for future reference. The UE recovers from the physical layer problem when the UE receives N consecutive in synchronization or "In Sync" indications while timer T310 is running. In this case, the timer T310 will be stopped and the UE proceeds normally with the current RRC connection with the serving cell. Upon reception of N310 "Out of Sync" indications, the UE starts the T310 timer. To overcome the above mentioned problem, in an embodiment of the present disclosure, a UE logs the available measurements at each reception of an "Out of Sync" indication from the physical layer and the logged information is used to recover from the RLF or "near RLF" situation.

According to the present disclosure, the UE recovers from the RLF situation by receiving N successive "In Sync" indications. According to the present embodiment, the UE retains the measurement information associated with the "Out of Sync" indications before which the UE recovered from the physical layer problem. In order to indicate to the network that the UE has recovered, a Boolean field is set in RRC connection establishment or reestablishment complete messages to indicate the network presence of the information. When the Boolean field is set, it indicates to the network that RLF was not declared but the UE encountered a temporary loss of synchronization from which it recovered before encountering an actual RLF. Additionally, the UE provides the information of the number of "Out of Sync" indications received and the T310 timer's elapsed time. The information provided by the UE to the network indicates how close the UE was to declaring an RLF and averts the UE in the future before facing similar problems.

Figure 3:
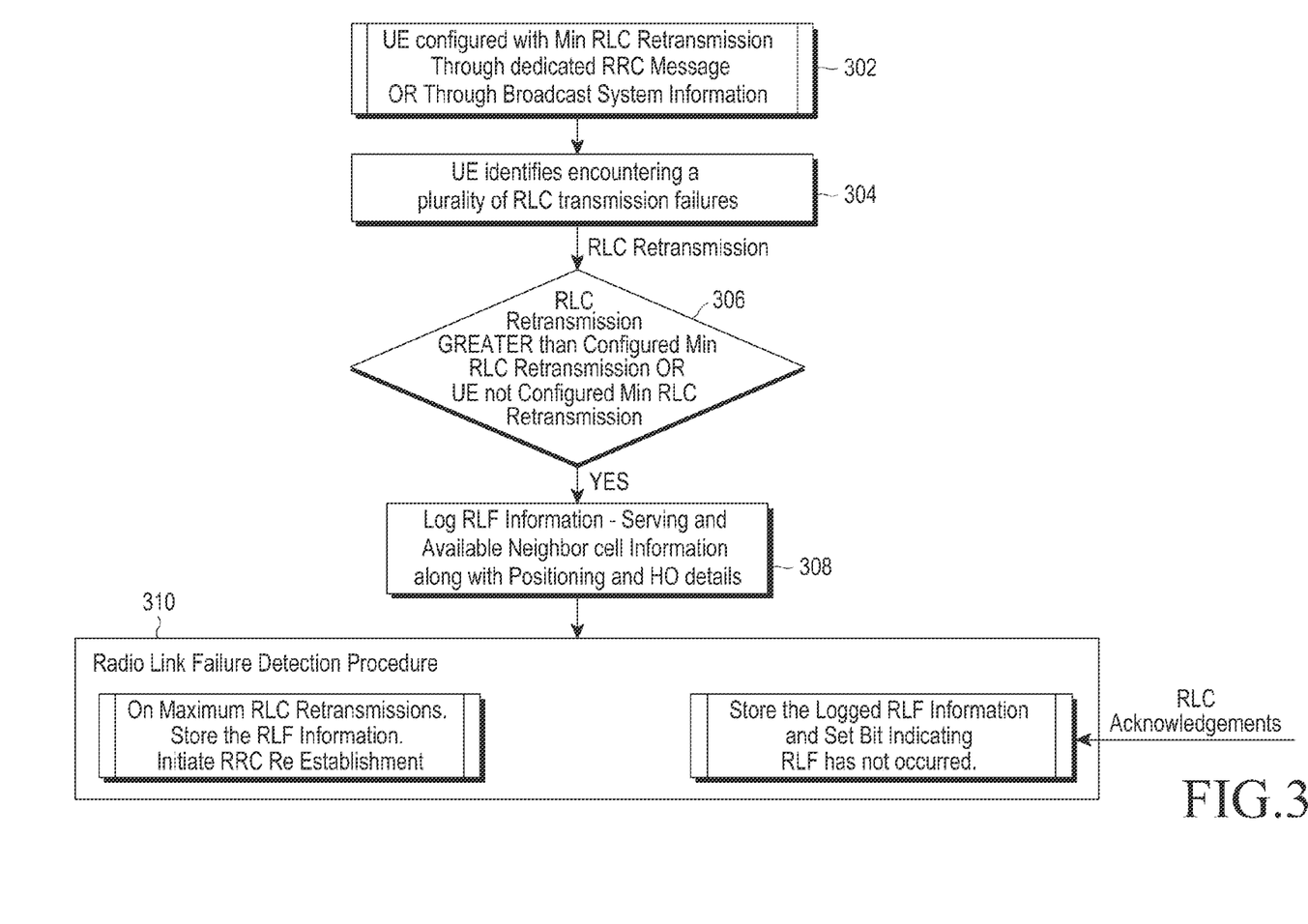
FIG. 3 is a flowchart illustrating a method for enhancing reporting information for an RLF at an RLC layer in an LTE network according to an embodiment of the present disclosure.

FIG. 3 is a flowchart illustrating a method for enhancing reporting information for an RLF at an RLC layer in an LTE network according to an embodiment of the present disclosure. According to an embodiment of the present disclosure, in step 302, the network configures a UE with a minimum threshold for Radio Link Control (RLC) retransmissions. The configuring of the UE with minimum threshold for RLC retransmission can be via a dedicated RRC message or based on broadcast system information. In step 304, the UE identifies encountering a plurality of RLC transmission failures. The UE allows failure in an RLC transmission for a threshold number of attempts and retransmits the RLC message until the threshold value indicates that the UE has a normal radio link connection. The UE identifies the number of RLC transmission failures.

In step 306, the UE checks whether the number of RLC retransmissions performed by the UE is greater than the configured minimum threshold for RLC retransmissions. If the number of RLC retransmissions is less than the configured threshold for RLC retransmission, then the UE attempts another RLC retransmission, and the UE checks whether the attempt is successful or not. If the attempt fails, then the UE checks again whether the number of RLC retransmissions is greater than the configured minimum threshold for RLC retransmissions. If the RLC retransmission is greater that the configured RLC retransmission threshold, then in step 308, the UE identifies that near RLF has occurred and thus logs the RLF information. During logging, the UE logs the RLF information along with information on a serving cell and information on available neighboring cells along with positioning information, if the number of RLC retransmissions is greater that the configured RLC retransmission count. In an embodiment of the present disclosure, if the UE is not configured with the minimum threshold for RLC retransmission, then the UE logs the RLC information immediately after facing the first RLC retransmission failure. The UE logs the RLC information via one of a dedicated RRC signaling and a Broadcast System Information.

Once the RLF information is logged in the UE, then in step 310, the UE performs an RLC detection procedure based on the RLF information, wherein the RLC detection procedure includes the UE receiving a successful RLC transmission acknowledgement from the network, and retaining the logged information associated with one or more temporary RLC failures so that the information can be used in future scenarios. The UE stores the information of a number of RLC retransmissions before a successful RLC retransmission along with "near RLF" measurements. According to an embodiment of the present disclosure, the UE indicates to the network that the RRC reestablishment is not triggered and thus indicates availability of the near RLF information.

According to the present disclosure, the network configures the UE with a minimum number of RLC retransmissions using a dedicated RRC signaling message. In an embodiment of the present disclosure, the dedicated RRC signaling message is an RRC reconfiguration message sent from the network to the UE. Upon receiving the RRC signaling message, the UE logs the serving cell after each RLC retransmission failure. The UE initiates monitoring and logging of the RLC retransmission failures from the first RLC retransmission. The UE keeps tracking and identifying whether the number of RLC transmissions is greater than the configured number of RLC retransmissions after each RLC retransmission attempt. Once the UE identifies that the number of RLC retransmissions is greater than the configured RLC retransmission count, the UE logs the information related to the serving cell, the available neighbor measurements and available positioning information. When the UE recovers from a "near RLF" situation and the RLC retransmissions are successful after the UE has started logging the information, the UE retains the "near RLF" reporting information and indicates the presence of the "near RLF" information by setting a Boolean field in the RRC connection establishment or Reestablishment connection messages to indicate the network presence of the information. Further, the UE provides the information of the number of RLC retransmissions encountered before encountering a successful RLC transmission. The information provided by the UE to the network can be helpful to the network to identify about how close the UE was to declaring an RLF and, in future scenarios, the UE can be averted from such "near RLF" situations.

Figure 4:
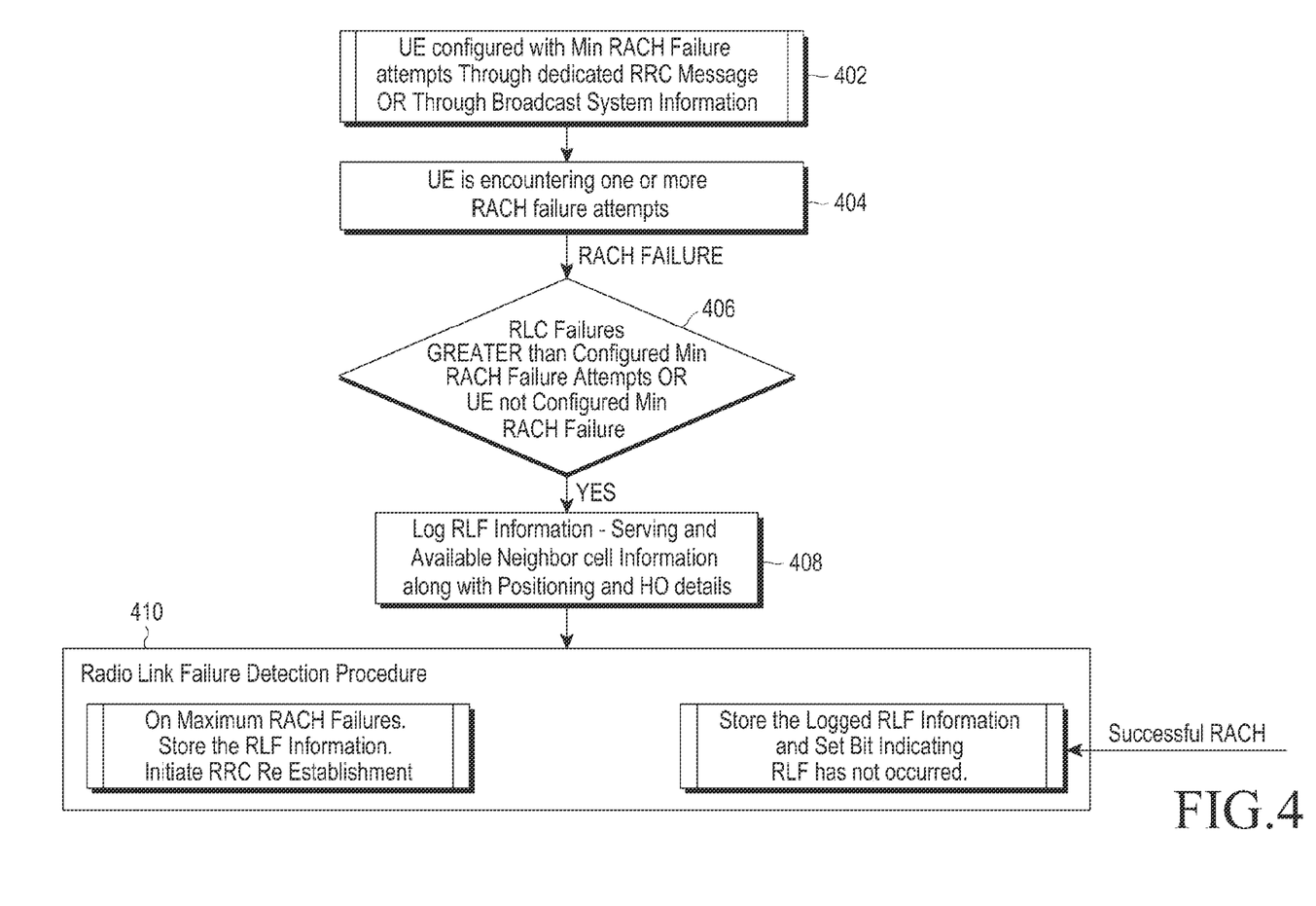
FIG. 4 is a flowchart illustrating a method for enhancing reporting information for an RLF to recover from MAC Random Access CHannel (RACH) failures in an LTE network according to an embodiment of the present disclosure.

FIG. 4 is a flowchart illustrating a method for enhancing reporting information for an RLF while recovering from MAC RACH failures in an LTE network, according to an embodiment of the present disclosure. According to the present disclosure, in step 402, the network configures a UE with a number of attempts for a Random Access Channel (RACH) failure. If the UE faces a RACH failure on the first attempt, then the UE can make only the number of attempts to access the RACH, as set by the network.

In step 404, the UE identifies that the UE is encountering one or more RACH failure attempts. The UE identifies that it is unable to obtain MAC RACH, and identifies the number of times the RACH failure attempts are encountered. In step 406, the UE determines whether the number of RACH failure attempts is greater than a number of the configured minimum RACH failure attempts. After each RACH failure attempt, the UE determines whether the number of RACH failure attempts by the UE is greater than the number of RACH failure attempts that the UE can attempt, as set by the network. If the UE identifies the number of RACH failure attempts in less than the number of RACH failure attempts that the UE can attempt, then the UE makes another attempt for obtaining the RACH.

If the UE identifies that the number of RACH failure attempts is greater than the configured minimum number of RACH failure attempts set by the network, then in step 408, the UE logs RLF information. In an embodiment of the present disclosure, if the UE is not configured by the network with a minimum number of RACH failure attempts, then the UE logs RLF information immediately after encountering a first RACH failure.

While logging the RLF information upon identifying that the number of RACH failure attempts is greater that the configured minimum number of RACH failure attempts, the UE logs information on a serving cell and information on available neighboring cells along with positioning information, wherein the UE logs the minimum number of RACH failure attempts via one of dedicated RRC signaling and Broadcast System Information.

Once the RLF information is logged in the UE, then in step 410, the UE performs an RRC re-establishment procedure based on the RLF information, wherein the RRC re-establishment procedure includes the UE storing the RLF information and setting a Boolean field in RRC connection establishment or re-establishment complete messages to indicate the presence of the information in the network. Further, the UE provides information of the number of MAC RACH failures encountered before a successful MAC RACH.

According to an embodiment of the present disclosure, the network configures the UE with a minimum number of MAC RACH failure attempts using a dedicated RRC signaling message. In an embodiment of the present invention, the RRC signaling message sent by the network can be an RRC reconfiguration message. Upon receiving the RRC signaling message, the UE logs the serving cell after each MAC RACH failed attempt. The UE initiates monitoring from the first MAC RACH failure. After encountering the minimum number of RACH failures as configured by the network, the UE logs the serving cell on each MAC RACH failure attempt and also logs the available neighbor measurements and available positioning information. When the UE recovers from the situation of a recurring MAC RACH failure, and the MAC RACH attempt is successful, the "near RLF" information is stored and retained for future use. The UE indicates the "near RLF" information by setting a Boolean field in the RRC connection establishment or Re-establishment complete messages to indicate the presence of the information in the network. Additionally, the UE provides the information of the number of MAC RACH failures encountered before encountering a successful MACH RACH attempt. Thus, the UE can provide the necessary information to the network on how close the UE was to declaring an RLF.

The present disclosure have been described with reference to embodiments of the present invention; it will be evident that various modifications and changes may be made to these embodiments without departing from the scope and spirit of the present disclosure. Furthermore, the various devices, modules, and the like described herein may be enabled and operated using hardware circuitry, for example, Complementary Metal Oxide Semiconductor (CMOS) based logic circuitry, firmware, software and/or any combination of hardware, firmware, and/or software embodied in a machine readable medium.

Although the present disclosure is described with various embodiments, it will be obvious for a person skilled in the art to practice the present disclosure with modifications. However, all such modifications are deemed to be within the scope of the claims, as defined by the appended claims and their equivalents.

What is claimed is:

1. A method of enhancing reporting information for a Radio Link Failure (RLF) in a Long Term Evolution (LTE) network, the method comprising:
   receiving, by a User Equipment (UE), RLF threshold information transmitted from the LTE network;
   logging, by the UE, the RLF threshold information; and
   indicating, by the UE, a near RLF condition by setting a Boolean field in at least one of a Radio Resource Control (RRC) connection establishment message and an RRC connection Reestablishment complete message,
   wherein the near RLF condition is a situation that the UE is about to face an RLF but recovers.

2. The method of claim 1, wherein the RLF threshold information comprises link quality measurement of serving carriers, and one or more secondary carriers along with a link quality information for secondary carriers, where the link quality measurement indicates an out of synchronization condition.

3. The method of claim 1, wherein logging, by the UE, the RLF threshold information comprises:
   triggering a timer on reception of the RLF threshold information; and
   storing the RLF threshold information.

4. The method of claim 1, wherein logging, by the UE, the RLF threshold information further comprises:
   initiating a timer on reception of the RLF threshold information;
   terminating the timer at a measurement information associated with the logged RLF threshold information; and
   setting a bit in the RRC connection establishment message indicating to the LTE network that an RLF has not occurred.

5. The method of claim 1, further comprising logging, by the UE, the RLF threshold information at each reception of the out of synchronization indication from a physical layer.

6. The method of claim 1, wherein the RLF threshold information comprises information on a serving cell and information on an available neighbor cell along with positioning information and hand-over details.

7. The method of claim 1, further comprising:
   storing, by the UE, information of a number of out of synchronization indications received and a value of an elapsed timer along with stored measurements of a near RLF before the UE recovered from a physical layer failure.

8. The method of claim 6, wherein the information on the serving cell and the information on the available neighboring cells along with the positioning information is stored for each out of synchronization indication.

9. The method of claim 1, wherein the UE represents the RLF threshold information by a bit representation flag in the RRC connection establishment message.

10. The method of claim 1, further comprising:
    indicating, by the UE, to the LTE network that the RRC reestablishment is not triggered and availability of information concerning the near RLF.

11. A method of enhancing reporting information for a Radio Link Failure (RLF) in a Long Term Evolution (LTE) network, the method comprising:
configuring, by the LTE network, a User Equipment (UE) with a minimum threshold for a number of Radio Link Control (RLC) retransmissions;
identifying, by the UE, encountering a plurality of RLC transmission failures;
determining, by the UE, if a number of RLC transmissions received from the LTE network is greater than the configured minimum threshold for the number of RLC retransmissions;
logging RLF information if the number of RLC retransmissions is greater than the configured minimum threshold for the number of RLC retransmissions; and
reporting an occurrence of a near RLF condition by setting a Boolean field in at least one of a Radio Resource Control (RRC) connection establishment message and an RRC connection Reestablishment complete message,
wherein the near RLF condition is a situation that the UE is about to face an RLF but recovers.

12. The method of claim 11, further comprising: logging, by the UE, the RLF information immediately after encountering an RLC retransmission failure, if the UE is not configured with the minimum threshold for the number of RLC retransmissions.

13. The method of claim 11, further comprising the UE logging the RLF information along with information on a serving cell and information on available neighboring cells along with positioning information, if the number of RLC retransmissions is greater than the configured minimum threshold for the number of RLC retransmissions.

* * * * *